(12) United States Patent
Xu et al.

(10) Patent No.: US 11,463,036 B2
(45) Date of Patent: Oct. 4, 2022

(54) METHOD FOR ANALYZING MAGNETOMOTIVE FORCE OF WINDINGS IN SHORT PRIMARY LINEAR MACHINE

(71) Applicant: HUAZHONG UNIVERSITY OF SCIENCE AND TECHNOLOGY, Hubei (CN)

(72) Inventors: Wei Xu, Hubei (CN); Jian Ge, Hubei (CN); Yi Liu, Hubei (CN); Yaping Zhang, Hubei (CN); Fei Xiong, Hubei (CN); Jingyue Su, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/427,101

(22) PCT Filed: Aug. 27, 2020

(86) PCT No.: PCT/CN2020/111561
§ 371 (c)(1),
(2) Date: Jul. 30, 2021

(87) PCT Pub. No.: WO2021/258528
PCT Pub. Date: Dec. 30, 2021

(65) Prior Publication Data
US 2022/0149765 A1 May 12, 2022

(30) Foreign Application Priority Data
Jun. 24, 2020 (CN) .......................... 202010591189.1

(51) Int. Cl.
*H02P 25/064* (2016.01)
*H02P 25/06* (2016.01)
*H02K 41/02* (2006.01)

(52) U.S. Cl.
CPC ............. *H02P 25/06* (2013.01); *H02K 41/02* (2013.01); *H02K 2213/03* (2013.01)

(58) Field of Classification Search
CPC ...... H02K 1/148; H02P 25/062; H02P 25/064
See application file for complete search history.

(56) References Cited

U.S. PATENT DOCUMENTS 9,595,858 B2 * 3/2017 Lipo ..................... H02K 1/2793
10,594,179 B2 * 3/2020 Liu ......................... H02K 21/14

FOREIGN PATENT DOCUMENTS

CN         202455245 U  *  9/2012
CN         107579606 A  *  1/2018
(Continued)

OTHER PUBLICATIONS

"International Search Report (Form PCT/ISA/210) of PCT/CN2020/111561" dated Mar. 11, 2021, pp. 1-4.
(Continued)

*Primary Examiner* — Thai T Dinh
(74) *Attorney, Agent, or Firm* — JCIP Global Inc.

(57) ABSTRACT

The disclosure uses the Carter's coefficient to correct the equivalent electromagnetic air gap length. And the specific permeance on both sides of the primary core is obtained. Then, the permeance on both sides based on the structure of the primary core is calculated. An equation is established by using the continuity principle of flux, thereby obtaining the air gap magnetomotive force model of current-carrying conductor. The slot vector diagram of magnetomotive force in short primary linear machine is illustrated according to that in the rotating machine. Then, based on the winding arrangement and vector combination, the amplitude and phase of various spatial harmonic wave of the three-phase winding are obtained. Finally, the characteristics of average component distribution of the current-carrying conductor (Continued)

are adopted to obtain the pulsating magnetomotive force generated by the three-phase winding of the linear machine.

7 Claims, 5 Drawing Sheets

(56) References Cited

FOREIGN PATENT DOCUMENTS

| | | | | |
|---|---|---|---|---|
| CN | 108365791 B | * | 1/2021 | .............. H02P 21/14 |
| JP | 2008199746 A | * | 8/2008 | |

OTHER PUBLICATIONS

"Written Opinion of the International Searching Authority (Form PCT/ISA/237) of PCT/CN2020/111561," dated Mar. 11, 2021, pp. 1-3.

Tian Yuanyuan et al., "Stator Magneto-motive Force and Winding Coefficient Analysis of Permanent Magnet Servo Motor with Fractional-slot Concentrated windings," Micromotors, vol. 45, Apr. 2021, pp. 1-7.

\* cited by examiner

S1: Carter's coefficient is adopted to modify the equivalent electromagnetic air gap length, and the specific permeance on both sides of the primary core is obtained. Then, the permeance on both sides of primary iron core is obtained based on the structure of the primary core. Thereafter, the principle of magnetic flux continuity is adopted to establish an equation. In this manner, the air gap magnetomotive force model of the current-carrying conductor can be obtained.

S2: A slot vector diagram of magnetomotive force in the short-primary linear machine is illustrated according to that in the rotating machine. Wherein the slot vector of magnetomotive force in short primary linear machine and each harmonic component of airgap magnetomotive force produced by the current-carrying conductor has a one-to-one correspondence.

S3: Based on the slot vector diagram of magnetomotive force in short-primary linear machine, the winding factor and phase of each pole-pair harmonic of each phase winding are calculated.

S4: According to the distribution characteristics of the average component of the slot magnetomotive force in the short-primary linear machine and the winding arrangement, the amplitude and phase of the pulsating magnetomotive force of the short-primary linear machine are analyzed and calculated.

FIG. 1

METHOD FOR ANALYZING MAGNETOMOTIVE FORCE OF WINDINGS IN SHORT PRIMARY LINEAR MACHINE

CROSS-REFERENCE TO RELATED APPLICATION

This application is a 371 of international application of PCT application serial no. PCT/CN2020/111561, filed on Aug. 27, 2020, which claims the priority benefits of China application no. 202010591189.1, filed on Jun. 24, 2020. The entirety of each of the above-mentioned patent applications is hereby incorporated by reference herein and made a part of this specification.

BACKGROUND

Technical Field

The disclosure belongs to the technical field of linear machines, and more specifically, relates to a method of analysing magnetomotive force of windings in short primary linear machine.

Description of Related Art

The linear machine is an electromagnetic device that realizes the mutual conversion of electrical energy and mechanical energy of linear motion. In long stroke applications, a short primary structure is generally adopted, such as the flat linear induction machine adopted in rail transit, and the flat permanent magnet linear synchronous machine adopted in the servo system, etc.

Due to the disconnection of the primary core on both sides, the magnetic circuit of the three-phase winding in the short primary linear machine is changed, making the winding magnetomotive force distribution more complicated than that in the rotating machine. Currently there are three common short primary linear machine winding structures: single-layer full pitch winding, fractional slot concentric winding, half-filled double-layer lap winding. For the harmonic magnetomotive force generated by the first two winding structures, the AC winding theory for rotating machines is generally adopted directly for analysis. For the harmonic magnetomotive force generated by the third winding structure, the primary winding is generally divided into three areas, namely "half-filled full-filled half-filled slot". Then, the AC winding theory for rotating machines is adopted in each area for analysis. In some studies, the influence of half-filled slot is ignored, and the AC winding theory is directly adopted.

The above analysis method can approximate the fundamental wave component and general harmonic component of the magnetomotive force of winding in short primary linear machine. However, such method is not accurate enough and cannot be applied to calculate other harmonic magnetomotive force components including pulsating magnetomotive force and negative sequence magnetomotive force. Therefore, it is necessary to provide a method of calculating airgap magnetomotive force of winding in short primary linear machine accurately.

SUMMARY

In view of the defects and needs of improvement in the related art, the present disclosure provides a method of analyzing magnetomotive force of winding in short primary linear machine. It is put forward to solve the technical problem of lack of thoroughness and inaccuracy when analyzing magnetomotive force of winding in short primary linear machine by traditional winding theory.

In order to achieve the above purpose, the present disclosure provides a method of analyzing magnetomotive force of winding in short primary linear machine, which includes the following steps:

S1: Carter's coefficient is adopted to modify the equivalent electromagnetic air gap length, and the specific permeance on both sides of the primary core is obtained. Then, the permeances on both sides of primary iron core is obtained based on the structure of the primary core. Thereafter, the principle of magnetic flux continuity is adopted to establish an equation. In this manner, the air gap magnetomotive force model of the current-carrying conductor can be obtained.

S2: A slot vector diagram of magnetomotive force in the short primary linear machine is illustrated according to that in the rotating machine. Wherein the slot vector of magnetomotive force in short primary linear machine and each harmonic component of airgap magnetomotive force produced by the current-carrying conductor has a one-to-one correspondence.

S3: Based on the slot vector diagram of magnetomotive force in short primary linear machine, the winding factor and phase of each pole-pair harmonic of each phase winding are calculated.

S4: According to the distribution characteristics of the average component of the slot magnetomotive force in the short primary linear machine and the winding arrangement, the amplitude and phase of the pulsating magnetomotive force of the short primary linear machine are analyzed and calculated.

Further, following the step S3, the method further includes:

Matrix transformation is performed on the winding factors and phases of each pole-pair harmonic of each phase winding to obtain the winding factors and initial phases corresponding to the forward traveling wave component and the backward traveling wave component of each pole-pair harmonic of magnetomotive force.

Further, a slot vector diagram of magnetomotive force in short primary linear machine illustrated according to that in the rotating machine in step S2 includes:

The magnitude and phase of the shift vector are determined based on the relationship between the rotating machine and the short primary linear machine. Then, the slot vector of magnetomotive force in the rotating machine and the shift vector are combined to obtain the slot vector of magnetomotive force in the short primary linear machine.

Further, the air gap magnetomotive force model produced by the current-carrying conductor can be expressed as:

$$F_c(x) = K_0(x_c)I + \sum_{v=1}^{\infty} K_v(x_c)I\cos\left(\frac{2v\pi}{L}x + \theta_c\right).$$

Specifically, $$K_0(x_c) = \frac{1 - \frac{2x_c}{L}}{2 + \frac{L}{K_\Lambda}},$$

-continued $$K_\Lambda = \frac{H+\delta_e}{2}\left[\sqrt{1+\left(\frac{\pi(H+\delta_e)}{4\delta_e}\right)^2} - \frac{\pi(H+\delta_e)}{4\delta_e} + \frac{ar\sinh\frac{\pi(H+\delta_e)}{4\delta_e}}{\frac{\pi(H+\delta_e)}{4\delta_e}}\right],$$

$$K_v(x_c) = \frac{2}{v\pi}\sin\frac{v\pi x_c}{L}, \theta_c = -\frac{\pi(vx_c - L)}{L}.$$

In the formula, v is the pole pair number of harmonics, I is the current amplitude of the conductor in the slot, $x_c$ is the position of the conductor, L is the length of the primary core, H is the height of the primary core, and $\delta_e$ is the equivalent electromagnetic air gap length.

Further, step S3 includes the calculation of the winding factors and phases of the conventional winding and the non-conventional winding. The conventional winding includes a single-layer winding, and the non-conventional winding includes a half-filled double-layer lap winding.

Further, when the slot is located on the center line of the primary core, the average component of the slot magnetomotive force of the short primary linear machine is zero. And the average component is greater when the slot is closer to both ends.

Further, the method is applied to a short primary linear machine with iron core operating at unsaturated point.

In general, through the above technical solutions conceived in the present disclosure, the following advantageous effects can be achieved:

For the existing method of analyzing the magnetomotive force of the primary winding in the short primary linear machine, it only adopts the analysis result of the magnetomotive force in the rotating machine. In the present disclosure, the influence of the end of the primary core is taken into consideration. The Carter's coefficient is used to correct the equivalent electromagnetic air gap length. And the specific permeance on both sides of the primary core is obtained. Then, the permeance on both sides is calculated based on the structure of the primary core. Then, an equation is established by using the magnetic flux continuity principle. Thereby the model of air gap magnetomotive force by a current-carrying conductor is obtained. A slot vector diagram of magnetomotive force in the short primary linear machine is illustrated according to that in the rotating machine. Finally, the amplitude and phase of the pulsating magnetomotive force in the short primary linear machine are analyzed and calculated. The analysis method provided by the disclosure can calculate the magnetomotive force of winding in short primary linear machine more comprehensively and accurately.

BRIEF DESCRIPTION OF THE DRAWINGS

FIG. 1 is a flow chart of the method of analyzing magnetomotive force of winding in short primary linear machine provided by the present disclosure.

FIG. 6-1 is a slot vector diagram of magnetomotive force in the rotating machine, and FIG. 6-2 is a slot vector diagram of magnetomotive force in the short primary linear machine.

FIG. 7-1 is a slot vector diagram of magnetomotive force in the rotating machine, and FIG. 7-2 is a slot vector diagram of magnetomotive force in the short primary linear machine.

DESCRIPTION OF THE EMBODIMENTS

Figure 2:
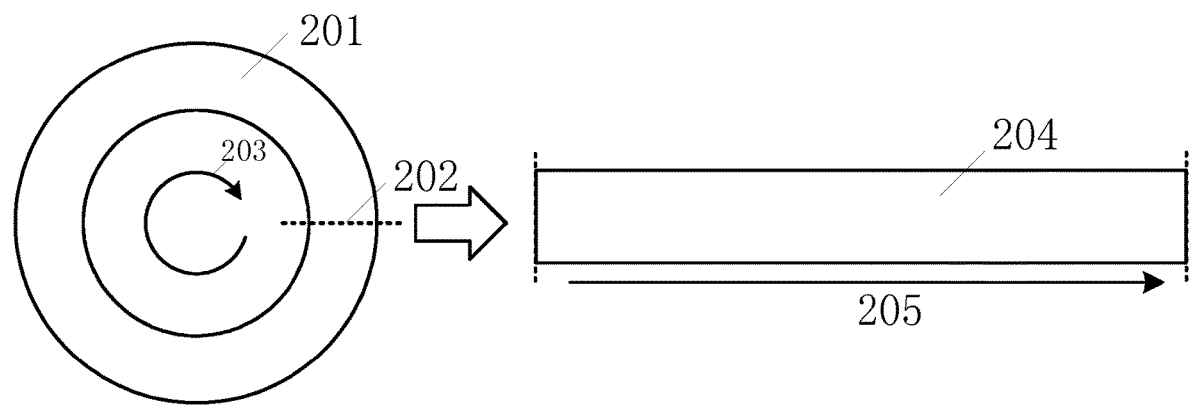
FIG. 2 is a schematic view of the conversion process in which the rotating machine is transformed into the short primary linear machine and the corresponding relationship provided by the present disclosure.

In order to make the purpose, technical solutions, and advantages of the present disclosure clearer, the following further describes the present disclosure in detail with reference to the accompanying drawings and embodiments. It should be understood that the specific embodiments described here are only used to explain the present disclosure, but not to limit the present disclosure. In addition, the technical features involved in the various embodiments of the present disclosure described below can be combined with each other as long as they do not conflict with each other.

As shown in FIG. 1, FIG. 1 is a flow chart of the method of analyzing magnetomotive force of winding in short primary linear machine provided by the present disclosure, which includes the following steps:

S1: Carter's coefficient is adopted to modify the equivalent electromagnetic air gap length, and the specific permeance on both sides of the primary core is obtained. Then, the permeance on both sides of primary iron core is obtained based on the structure of the primary core. Thereafter, the principle of magnetic flux continuity is adopted to establish an equation. In this manner, the air gap magnetomotive force model of the current-carrying conductor can be obtained.

S2: A slot vector diagram of magnetomotive force in the short primary linear machine is illustrated according to that in the rotating machine. Wherein the slot vector of magnetomotive force in short primary linear machine and each harmonic component of airgap magnetomotive force produced by the current-carrying conductor has a one-to-one correspondence.

S3: Based on the slot vector diagram of magnetomotive force in short primary linear machine, the winding factor and phase of each pole-pair harmonic of each phase winding are calculated.

S4: According to the distribution characteristics of the average component of the slot magnetomotive force in the short primary linear machine and the winding arrangement, the amplitude and phase of the pulsating magnetomotive force of the short primary linear machine are analyzed and calculated.

The process of establishing the air gap magnetomotive force model of the current-carrying conductor is described in detail below.

Under the condition of ignoring magnetic potential drop in the iron core, core loss, tooth harmonics, modifying the equivalent electromagnetic air gap length by using the Carter's coefficient while only taking into consideration the normal component of the air gap magnetomotive force, the air gap magnetomotive force model of the current-carrying conductor is established.

(1) The equivalent electromagnetic air gap length is corrected by Carter's coefficient to:

$$\delta_e \approx \frac{\tau_s}{\tau_s - \frac{b_o^2}{5\delta + b_o}} \delta$$

In the formula, $\tau_s$ is the slot pitch, $b_o$ is the slot width, and $\delta$ is the physical air gap length.

(2) The maximum air gap specific permeance in the middle of the machine is set as $\lambda_{max}$, and the relative specific permeance is defined as:

$$\lambda_r = \frac{\lambda}{\lambda_{max}} = \frac{\delta_e}{\mu_0}\lambda$$

In the formula, $\mu_0$ is the vacuum permeability, and $\lambda$ is the specific permeance.

(3) Through Schwarz-Christoffel mapping, the relationship between the air gap relative specific permeance near the end and the position x can be expressed as:

$$\frac{x}{\delta_e} = \frac{1}{\pi}\left(\frac{2}{\lambda_r} + \ln\frac{1-\lambda_r}{1+\lambda_r}\right)$$

The logarithmic term is expanded by Taylor series, and the first term can be approximated to:

$$\lambda_r = \begin{cases} 1 & x < 0 \\ \sqrt{1+\left(\frac{\pi x}{4\delta_e}\right)^2} - \frac{\pi x}{4\delta_e} & x \geq 0 \end{cases}$$

(4) The air gap magnetomotive force model can be expressed as:

$$F_c(x) = \begin{cases} F_l & 0 < x < x_c \\ F_r & x_c < x < L \end{cases}$$

In the formula, $x_c$ is the location of the conductor.

(5) According to Ampere's circuital law: $F_r - F_l = I$, the end permeance can be solved as:

$$\Lambda_{end} \approx \frac{\mu_0 D}{\delta_e} \int_{-(H+\delta_e)}^{0} \lambda_r dx = \frac{\mu_0}{\delta_e} K_\Lambda D$$

Specifically, $$K_\Lambda = \frac{H+\delta_e}{2}\left[\sqrt{1+\left(\frac{\pi(H+\delta_e)}{4\delta_e}\right)^2} - \frac{\pi(H+\delta_e)}{4\delta_e} + \frac{ar\sinh\frac{\pi(H+\delta_e)}{4\delta_e}}{\frac{\pi(H+\delta_e)}{4\delta_e}}\right]$$

In the formula, D and H represent the transverse length and height of the primary core respectively.

Permeance on both sides of the conductor:

$$\Lambda_{left} = \Lambda_l + \Lambda_{end} = \frac{\mu_0 D}{\delta_e}x_c + K_\Lambda \frac{\mu_0 D}{\delta_e}$$
$$\Lambda_{right} = \Lambda_r + \Lambda_{end} = \frac{\mu_0 D}{\delta_e}(L-x_c) + K_\Lambda \frac{\mu_0 D}{\delta_e}$$

(6) According to the continuity principle of flux: $F_l\Lambda_{left} + F_r\Lambda_{right} = 0$, the air gap magnetomotive force model of the current-carrying conductor can be expressed as:

$$F_c(x) = K_0(x_c)I + \sum_{v=1}^{\infty} K_v(x_c)I\cos\left(\frac{2v\pi}{L}x + \theta_c\right),$$

wherein the model includes two parts: spatial average component and harmonic component.

Specifically, $$K_0(x_c) = \frac{1-\frac{2x_c}{L}}{2+\frac{L}{K_\Lambda}},$$

$$K_\Lambda = \frac{H+\delta_e}{2}\left[\sqrt{1+\left(\frac{\pi(H+\delta_e)}{4\delta_e}\right)^2} - \frac{\pi(H+\delta_e)}{4\delta_e} + \frac{ar\sinh\frac{\pi(H+\delta_e)}{4\delta_e}}{\frac{\pi(H+\delta_e)}{4\delta_e}}\right]$$

$$K_v(x_c) = \frac{2}{v\pi}\sin\frac{v\pi x_c}{L},$$

$$\theta_c = -\frac{\pi(vx_c - L)}{L}.$$

In the formula, v is the pole-pair number of harmonic, I is the amplitude of the conductor current in the slot, $x_c$ is the position of the conductor, L is the length of the primary core, H is the height of the primary core, and $\delta_e$ is the equivalent electromagnetic air gap length; $K_0$ is the coefficient of the average component of the air gap magnetomotive force of a single conductor, $K_\Lambda$ is the intermediate variable obtained in the Schwarz-Christoffel transformation process, and $K_v$ is the coefficient of the space harmonic component of air gap magnetomotive force produced by a single conductor.

Each harmonic component in the expression $$F_c(x) = K_0(x_c)I + \sum_{v=1}^{\infty} K_v(x_c)I\cos\left(\frac{2v\pi}{L}x + \theta_c\right)$$

is written in the form of a space vector and correspond to the slot number. The relationship between the conductor position and the slot number can be expressed as:

$$x_c(n) = \frac{(2n-1)L}{2Z}.$$

In the formula, n is the slot number, and Z is the total number of slots in the primary core.

The following further explains how to analyse and calculate magnetomotive force of winding in short primary linear machine after establishing the air gap magnetomotive force model for the current-carrying conductor.

Specifically, the corresponding relationship between the structure of the rotating machine and the short primary linear machine and the slot number is shown in FIG. 2. The armature core 201 of the rotating machine is cut along the dashed line 202 to obtain the linear machine primary core 204. The slot number of the rotating machine is set in clockwise direction 203 from 1 to Z in sequence starting from the slot closest to the dashed line 202, and the slot number of the linear machine is set from 1 to Z in the direction 205.

Figure 3:
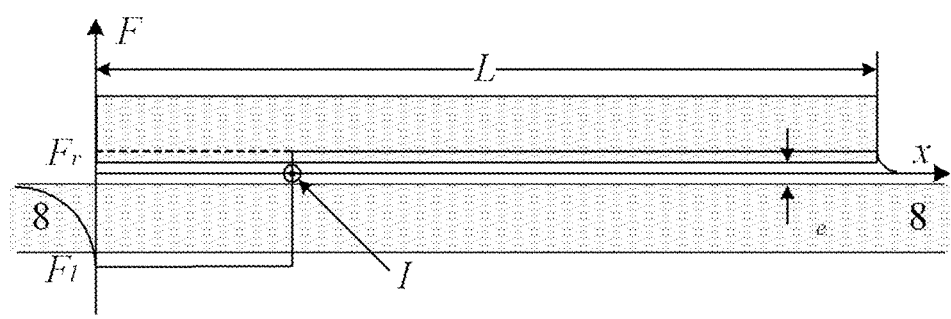
FIG. 3 is a schematic view of the air gap magnetomotive force distribution of the current-carrying conductor of the short primary linear machine provided by the present disclosure.

The air gap magnetomotive force distribution generated by the energized conductor is shown in FIG. 3. Because the two ends of the primary core are open, the magnetic circuit on the left and right sides of the conductor is asymmetrical, the amplitude of air gap magnetic potential drop on the left and right sides of the conductor are not exactly the same. To determine the amplitude of air gap magnetic potential drop on both sides, the specific permeance at both ends of the primary is obtained through Schwarz-Christoffel mapping first. Then, the permeance on both sides is obtained according to the primary structure. Thereafter, an equation is established by using continuity principle of flux. Thereby the amplitude of air gap magnetic potential drop on both sides is solved.

Figure 4:
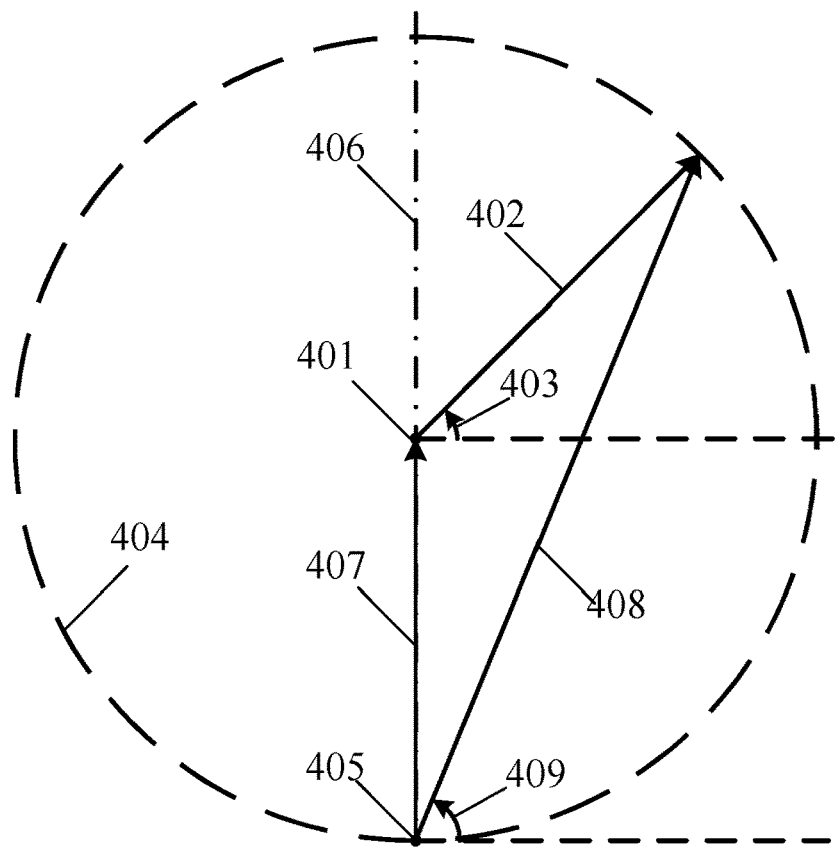
FIG. 4 is a schematic view of the corresponding relationship between the slot vector of magnetomotive force in the rotating machine and that in the short primary linear machine provided by the present disclosure.

The method of drawing the slot vector diagram of magnetomotive force is shown in FIG. 4. First, the coordinate origin 401 corresponding to the slot vector diagram of magnetomotive force in the rotating machine is determined. The vector 402 of a certain magnetomotive force harmonic wave of a certain slot in the rotating machine is illustrated, and a phase angle thereof is 403. The outer contour 404 of the slot vector diagram of magnetomotive force in the rotating machine is illustrated with the modulus of 402 as the radius. The space phase of the split position is taken on 404 as the coordinate origin 405 of the slot vector diagram of magnetomotive force for the linear machine. The straight line determined by 401 and 405 is the symmetry axis 406 of the slot vector diagram of magnetomotive force in the linear machine. The vector in the direction pointed from 405 to 401 is the shift vector 407. 402 and 407 are subjected to vector combination to obtain a certain slot vector 408 of certain magnetomotive force harmonic wave of the linear machine, and its phase angle is 409.

According to the conversion process in which rotating machine is transformed into a short primary linear machine and a corresponding relationship shown in FIG. 2 and the winding theory of the rotating machine, the slot vector of the rotating machine can be expressed as:

$$\vec{V}_{rv,n} = V_{rv}e^{j\theta_{rv,n}} = \frac{I}{v\pi}e^{j(-\frac{(2n-1)v\pi}{Z}-\frac{\pi}{2})}$$

According to the magnetomotive force model of current-carrying conductor in the short primary linear machine, the slot vector can be expressed as:

$$\vec{V}_{lv,n} = V_{lv,n}e^{j\theta_{lv,n}} = \frac{2I}{v\pi}\sin\frac{(2n-1)v\pi}{2Z}e^{j(\frac{(2n-1)v\pi}{2Z}+\pi)}$$

Then the shift vector is $$\vec{V}_{sv} = \vec{V}_{lv,n} - \vec{V}_{rv,n} = V_{lv,n}e^{j\theta_{lv,n}} - V_{rv}e^{j\theta_{rv,n}} = V_{rv}e^{j\frac{\pi}{2}}.$$

This vector is generated by the asymmetry of the conductor magnetic field caused by the primary end. The phase of this vector is unchanged, unrelated to the slot number, and is related to the number of harmonic pole pairs.

Further, subtraction is performed on the slot vectors corresponding to both sides of a coil to obtain the coil vector of magnetomotive force, which contains the amplitude and phase information. Various coil vectors constituting a certain phase winding are added up, thereby obtaining the phase winding vector of magnetomotive force, which also contains the amplitude and phase information.

Furthermore, the coil vectors of magnetomotive force are combined according to the arrangement of the windings of each phase, thereby obtaining the amplitude and phase of each winding vector. The ratio of the amplitude and the amplitude of vector generated by the full-pitch concentric winding of equal series turns is denoted as the winding factor.

Further, through matrix transformation, the winding factors and their spatial phases corresponding to the forward traveling wave component and the backward traveling wave component of the three-phase winding composite magnetomotive force are obtained.

Figure 5:
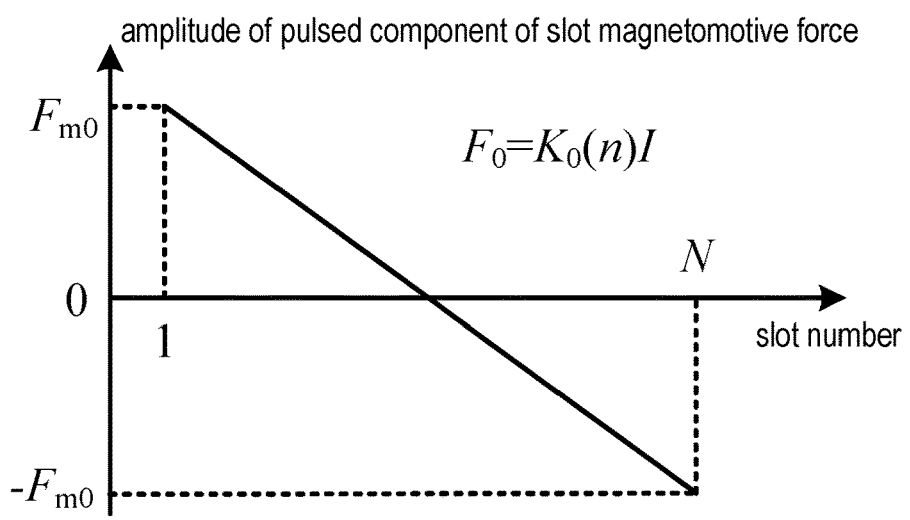
FIG. 5 is a schematic view showing the variation of average component of the magnetomotive force along with different slot number provided by the present disclosure.

Further, according to the calculation coefficients $K_0$ of the machine structure, FIG. 5 is obtained. The average component of the slot magnetomotive force of the short primary linear machine is approximately linear with the slot position. When the slot is located on the center line of the primary core, the average component of the slot magnetomotive force of the short primary linear machine is zero, and the average component is greater when the slot is closer to both ends.

The application principle of the present disclosure will be further described below with reference to two specific embodiments.

Embodiment 1: 12-Slot 2-Pole Single-Layer Full-Pitch Winding Linear Machine

First, the slot vector diagram of magnetomotive force in the rotating machine (fundamental wave v=1) is illustrated. And the winding phase is arranged according to the 60° phase band, which can be referred to FIG. 6-1. Then, the slot vectors of slots 1 to 12 are superimposed with the shift vector respectively, thereby obtaining the slot vectors of slots 1 to 12 for the linear machine, which can be referred to FIG. 6-2.

Figure 6:
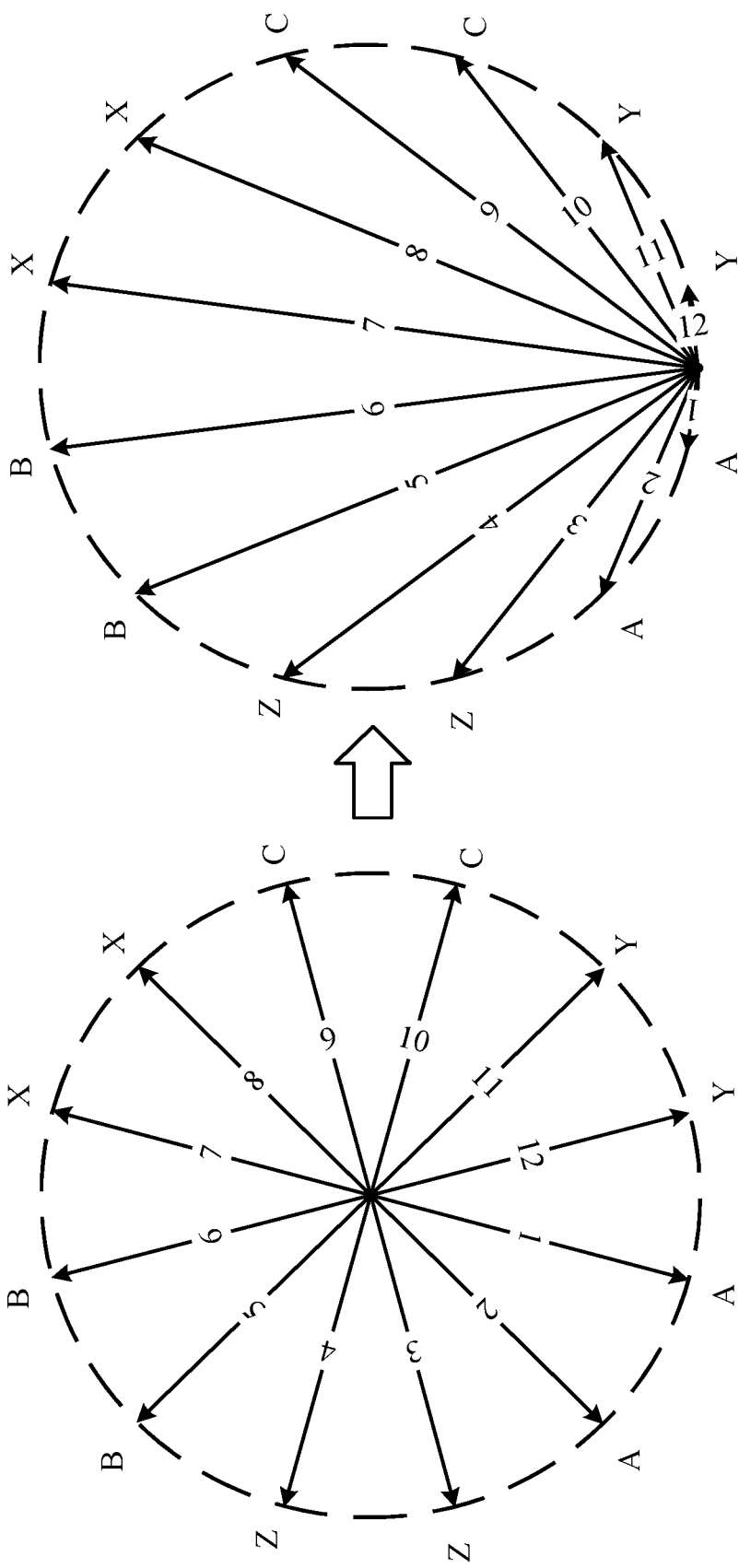
FIG. 6 is a slot vector diagram of fundamental magnetomotive force and a schematic view of winding distribution provided in the first embodiment of the present disclosure. Specifically.

Secondly, the winding of phase A shown in FIG. 6 is taken as an example. The slot numbers occupied by the windings are 1, 2, 7, 8, respectively. And the winding factor of phase A and the axis phase of the fundamental wave can be obtained by vector combination.

$$\begin{cases}\vec{V}_{A1} = \vec{V}_{l1,1} + \vec{V}_{l1,2} - \vec{V}_{l1,7} - \vec{V}_{l1,8} = V_{A1}e^{j\theta_A} \\ kw_A = \left|\frac{V_{A1}}{4V_{r1}}\right|, \; phase_A = \theta_A\end{cases}$$

In the same way, the winding factors of phase B and C and the axis phase of the fundamental wave can be obtained, respectively denoted as $kw_B$ and $kw_C$ as well as $phase_B$ and $phase_C$.

Next, matrix transformation is performed on the above calculation results to obtain the forward traveling wave winding factor, the backward traveling wave winding factor and the respective initial phases.

$$\begin{bmatrix} kw_p e^{jphase_p} \\ kw_n e^{jphase_n} \end{bmatrix} = \begin{bmatrix} 1 & e^{j\frac{2\pi}{3}} & e^{j\frac{4\pi}{3}} \\ 1 & e^{j\frac{4\pi}{3}} & e^{j\frac{2\pi}{3}} \end{bmatrix} \begin{bmatrix} kw_A e^{jphase_A} \\ kw_B e^{jphase_B} \\ kw_C e^{jphase_C} \end{bmatrix}$$

In the formula, $kw_p$ and $kw_n$ are the winding factors corresponding to the forward traveling waves and the backward traveling waves, respectively. And $phase_p$ as well as $phase_n$ are the initial phases of the forward traveling waves and the backward traveling waves, respectively.

Different values are set for the pole-pair number v, and the above steps are repeated to obtain the harmonic wave of the windings with different pole pairs.

Finally, the pulsating magnetomotive force coefficient is calculated.

$$kw_{dc}e^{jphase_{delay}} = \sum_{n=1,2} K_0(n)e^{j0} - \sum_{n=7,8} K_0(n)e^{j0} + \sum_{n=5,6} K_0(n)e^{-j\frac{2\pi}{3}} -$$
$$\sum_{n=11,12} K_0(n)e^{-j\frac{2\pi}{3}} + \sum_{n=9,10} K_0(n)e^{j\frac{2\pi}{3}} - \sum_{n=3,4} K_0(n)e^{j\frac{2\pi}{3}}$$

In the formula, $kw_{dc}$ is the three-phase pulsating magnetomotive force coefficient, $phase_{delay}$ is the angle at which the pulsating magnetomotive force lags behind the phase A current in time. The left side of the equation is multiplied by the conductor current and the number of coils turns to obtain the amplitude and phase of the pulsating magnetomotive force.

Embodiment 2: 13-Slot 10-Pole Fractional-Slot Concentric Winding Linear Machine Firstly, the slot vector diagram of magnetomotive force in the rotating machine (for fundamental wave, v=5) is illustrated. And the winding phase is arranged according to the 60° phase band combined with characteristics of linear machine half-filled slot, which can be referred to FIG. 7-1. Then, the slot vectors of slots 1 to 13 are superimposed with the shift vector respectively, thereby obtaining the slot vectors of slots 1 to 13 of the linear machine, which can be referred to FIG. 7-2.

Figure 7:
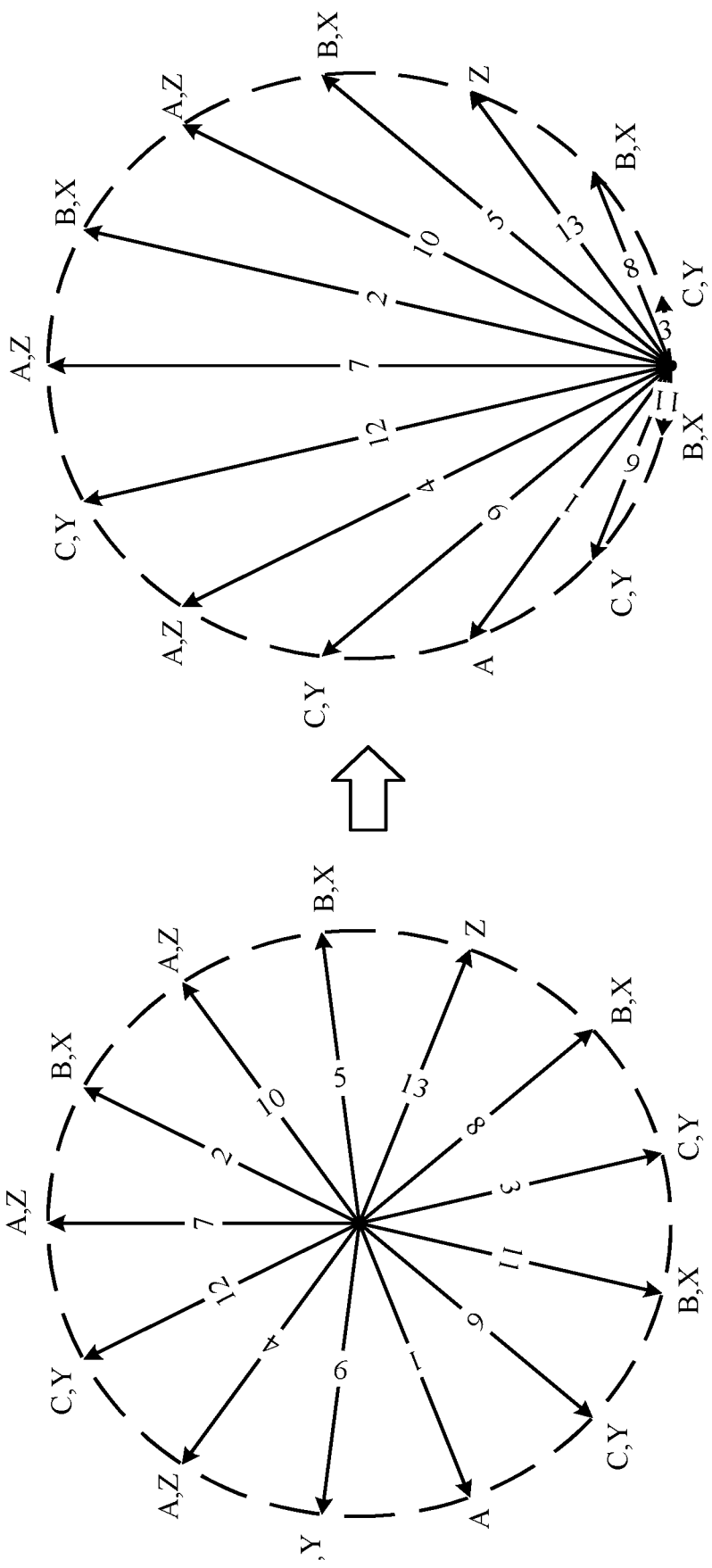
FIG. 7 is a slot vector diagram of fundamental magnetomotive force and a schematic view of winding distribution provided in the second embodiment of the present disclosure. Specifically.

Secondly, the winding of phase A shown in FIG. 7 is taken as an example, the slot numbers occupied by the windings are 1, 4, 7, 10, 2, 5, 8, 11, respectively. And the winding factor of phase A and the axis phase of the fundamental wave can be obtained by vector combination.

$$\begin{cases} \vec{V}_{A5} = \sum_{n=1,4,7,10} \vec{V}_{l5,n} - \sum_{n=2,5,8,11} \vec{V}_{l5,n} = V_{A5}e^{j\theta_A} \\ kw_A = \left|\frac{V_{A5}}{8V_{r5}}\right|, \; phase_A = \theta_A \end{cases}$$

In the same way, the winding factors of phase B and C and the axis phase of the fundamental wave can be obtained.

Next, matrix transformation is performed on the above calculation results to obtain the forward traveling wave winding factor, the backward traveling wave factor and the respective initial phases.

$$\begin{bmatrix} kw_p e^{jphase_p} \\ kw_n e^{jphase_n} \end{bmatrix} = \begin{bmatrix} 1 & e^{j\frac{2\pi}{3}} & e^{j\frac{4\pi}{3}} \\ 1 & e^{j\frac{4\pi}{3}} & e^{j\frac{2\pi}{3}} \end{bmatrix} \begin{bmatrix} kw_A e^{jphase_A} \\ kw_B e^{jphase_B} \\ kw_C e^{jphase_C} \end{bmatrix}$$

Different values are set for the pole pair number v, and the above steps are repeated to obtain the harmonic wave of the windings with different pole pairs.

Finally, the pulsating magnetomotive force coefficient is calculated.

$$kw_{dc}e^{jphase_{delay}} =$$
$$\sum_{n=1,4,7,10} K_0(n)e^{j0} - \sum_{n=2,5,8,11} K_0(n)e^{j0} + \sum_{n=2,8,5,11} K_0(n)e^{-j\frac{2\pi}{3}} -$$
$$\sum_{n=3,6,9,12} K_0(n)e^{-j\frac{2\pi}{3}} + \sum_{n=3,6,9,12} K_0(n)e^{j\frac{2\pi}{3}} - \sum_{n=4,7,10,13} K_0(n)e^{j\frac{2\pi}{3}}$$

By applying the analysis method of the present disclosure, combined with computer-aided calculation, the magnetomotive force of winding in short primary linear machine can be calculated more comprehensively and accurately.

Those skilled in the art can easily understand that the above are only preferred embodiments of the present disclosure and are not intended to limit the present disclosure. Any modification, equivalent replacement and improvement, etc., made within the spirit and principle of the present disclosure should fall within the protection scope of the present disclosure.

What is claimed is:

1. A method for analysing a magnetomotive force of winding in a short primary linear machine, comprising the following steps performed by a processor:

S1: Carter's coefficient is adopted to modify an equivalent electromagnetic air gap length, and a specific permeance on both sides of a primary core is obtained, permeances on both sides of primary iron core is obtained based on the structure of the primary core, a principle of magnetic flux continuity is adopted to establish an equation, and in this manner, an air gap magnetomotive force model of a current-carrying conductor can be obtained;

S2: a slot vector diagram of magnetomotive force in the short primary linear machine is illustrated according to that in a rotating machine, wherein the slot vector of magnetomotive force in short primary linear machine and each harmonic component of airgap magnetomotive force produced by the current-carrying conductor has a one-to-one correspondence;

S3: based on the slot vector diagram of magnetomotive force in short primary linear machine, a winding factor and phase of each pole-pair harmonic of each phase winding are calculated;

S4: according to the distribution characteristics of an average component of the slot magnetomotive force in the short primary linear machine and a winding arrangement, the amplitude and phase of the pulsating magnetomotive force of the short primary linear machine are analyzed and calculated,
wherein the method is applied to the short primary linear machine whose core operating at unsaturated point,
wherein the method further comprises:
modifying, by the processor, an operation of generating a linear motion of the short primary linear machine based on the winding factors and phases of each pair of pole-pair harmonics of each phase winding and the amplitude and the phase of the pulsating magnetomotive force.

2. The analysis method according to claim 1, wherein, following the step S3, the method further comprises:
matrix transformation is performed on the winding factors and phases of each pair of pole-pair harmonics of each phase winding to obtain the winding coefficients factors and initial phases corresponding to a forward traveling wave component and a backward traveling wave component of each pair of pole-pair harmonic of magnetomotive force.

3. The analysis method according to claim 2, wherein the slot vector diagram of magnetomotive force in the short primary linear machine illustrated according to that in the rotating machine in step S2 comprises:
the magnitude and a phase of a shift vector are determined based on the relationship between the rotating machine and the short primary linear machine, the slot vector of magnetomotive force in the rotating machine and the shift vector are combined to obtain the slot vector of magnetomotive force in the short primary linear machine.

4. The analysis method according to claim 1, wherein the slot vector diagram of magnetomotive force in the short primary linear machine illustrated according to that in the rotating machine in step S2 comprises:
the magnitude and a phase of a shift vector are determined based on the relationship between the rotating machine and the short primary linear machine, the slot vector of magnetomotive force in the rotating machine and the shift vector are combined to obtain the slot vector of magnetomotive force in the short primary linear machine.

5. The analysis method according to claim 1, wherein the air gap magnetomotive force model of the current-carrying conductor can be expressed as:

$$F_c(x) = K_0(x_c)I + \sum_{v=1}^{\infty} K_v(x_c) I \cos\left(\frac{2v\pi}{L}x + \theta_c\right);$$

specifically, $$K_0(x_c) = \frac{1 - \frac{2x_c}{L}}{2 + \frac{L}{K_\Lambda}},$$

$$K_\Lambda = \frac{H + \delta_e}{2}\left[\sqrt{1 + \left(\frac{\pi(H+\delta_e)}{4\delta_e}\right)^2} - \frac{\pi(H+\delta_e)}{4\delta_e} + \frac{\operatorname{arsinh}\frac{\pi(H+\delta_e)}{4\delta_e}}{\frac{\pi(H+\delta_e)}{4\delta_e}}\right],$$

$$K_v(x_c) = \frac{2}{v\pi}\sin\frac{v\pi x_c}{L},$$

$$\theta_c = -\frac{\pi(vx_c - L)}{L};$$

in the formula, v is a pole-pair number of harmonics, I is a current amplitude of a conductor in the slot, $x_c$ is a position of the conductor, L is a length of the primary core, H is a height of the primary core, and $\delta_e$ is an equivalent electromagnetic air gap length.

6. The analysis method according to claim 1, wherein step S3 comprises calculation of the winding coefficients and the phases of a conventional winding and a non-conventional winding, the conventional winding comprises a single-layer winding, and the non-conventional winding comprises a half-filled double-layer lap winding.

7. The analysis method according to claim 1, wherein when the slot is located on a center line of the primary core, an average component of the slot magnetomotive force of the short primary linear machine is zero, and the average component is greater when the slot is closer to both ends.

* * * * *